(12) United States Patent
Li et al.

(10) Patent No.: US 11,312,576 B2
(45) Date of Patent: Apr. 26, 2022

(54) GOODS PICKING SYSTEM AND METHOD

(71) Applicant: BEIJING GEEKPLUS TECHNOLOGY CO., LTD., Beijing (CN)

(72) Inventors: Hongbo Li, Beijing (CN); Kai Liu, Beijing (CN); Yong Zheng, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 205 days.

(21) Appl. No.: 16/500,091

(22) PCT Filed: Jun. 1, 2017

(86) PCT No.: PCT/CN2017/086882
§ 371 (c)(1),
(2) Date: Oct. 1, 2019

(87) PCT Pub. No.: WO2018/218620
PCT Pub. Date: Dec. 6, 2018

(65) Prior Publication Data
US 2020/0109007 A1     Apr. 9, 2020

(51) Int. Cl.
*G06F 7/00* (2006.01)
*B65G 1/137* (2006.01)
*B65G 43/10* (2006.01)

(52) U.S. Cl.
CPC ........... *B65G 1/1378* (2013.01); *B65G 43/10* (2013.01); *B65G 2203/0283* (2013.01)

(58) Field of Classification Search
CPC ............. B65G 1/1378; B65G 43/10; B65G 2203/0283; B65G 1/10; B65G 1/12;
(Continued)

(56) References Cited

U.S. PATENT DOCUMENTS 9,067,317 B1    6/2015  Wurman et al.
9,111,251 B1 *  8/2015  Brazeau .............. G06Q 10/087
(Continued)

FOREIGN PATENT DOCUMENTS

CN       102602643         7/2012
CN       102602643 A  *   7/2012
(Continued)

OTHER PUBLICATIONS

International Search Report dated Feb. 24, 2018 from related PCT Application No. PCT/CN2017/086882 with English Translation.
(Continued)

*Primary Examiner* — Yolanda R Cumbess
(74) *Attorney, Agent, or Firm* — Arentfox Schiff LLP

(57) ABSTRACT

Provided are a goods picking system and a goods picking system method, the system includes: a plurality of carrying robots; a plurality of racks used for storing goods and being carried by the plurality of carrying robots, where in a rack area, the plurality of racks are arranged in a rack array with a plurality of rows and a plurality of columns, and empty rows or columns constitute channels for the plurality of carrying robots to pass; and at least some of the plurality of racks are blocked racks which are not adjacent to any channel instead of being surrounded by other racks and racks except the blocked racks are referred to as unblocked racks; rack-moving robots, which are operable based on instructions of a control system to move racks in the rack area so as to change a certain blocked rack into an unblocked rack; operating positions.

17 Claims, 4 Drawing Sheets

(58) Field of Classification Search
CPC ....... B65G 1/137; G06Q 10/087; B25J 11/00; B25J 9/1664
USPC .................................. 700/213–216, 228–229
See application file for complete search history.

(56) References Cited

U.S. PATENT DOCUMENTS

| | | | | |
|---|---|---|---|---|
| 9,452,883 | B1* | 9/2016 | Wurman | ............... G05D 1/0287 |
| 2007/0017984 | A1* | 1/2007 | Mountz | ............... G06Q 10/087 |
| | | | | 235/385 |
| 2007/0293978 | A1* | 12/2007 | Wurman | ............... C07C 253/34 |
| | | | | 700/213 |
| 2014/0212249 | A1 | 7/2014 | Kawano | |
| 2018/0082162 | A1* | 3/2018 | Durham | ................. G06Q 50/28 |
| 2019/0195484 | A1 | 6/2019 | Yamana et al. | |

FOREIGN PATENT DOCUMENTS

| | | |
|---|---|---|
| CN | 104142682 | 11/2014 |
| CN | 105314317 | 2/2016 |
| CN | 106005866 | 10/2016 |
| CN | 106311615 | 1/2017 |
| GB | 1389221 | 4/1975 |
| JP | 2011001185 A | 1/2011 |
| WO | 2015052830 A1 | 3/2017 |
| WO | 2017/187539 A1 | 11/2017 |
| WO | 2018/056157 A1 | 2/2019 |

OTHER PUBLICATIONS

Third Japanese Office Action with English translation received to corresponding Japanese Patent Application No. 2019-516204 dated Dec. 2, 2020.
Korean Office Action received for corresponding Korean Patent Application No. KR 10-2019-7024256 dated Mar. 8, 2021.
First Written Opinion received for corresponding Singapore Patent Application No. SG 11201913944V dated Jan. 15, 2021.
First Office Action received for corresponding Japanese Patent Application No. JP 2019-516204 dated Aug. 22, 2019.
Second Office Action received for corresponding Japanese Patent Application No. JP 2019-516204 dated Nov. 5, 2019.

* cited by examiner

GOODS PICKING SYSTEM AND METHOD

CROSS REFERENCE TO RELATED APPLICATIONS

This application is a U.S. National Stage Application filed under 35 U.S.C. 371 of International Patent Application No. PCT/CN2017/086882, filed on Jun. 1, 2017, the contents of which is incorporated herein by reference in its entirety.

TECHNICAL FIELD

The present disclosure generally relates to logistics and warehousing technologies and in particular, relates to a goods picking method, a goods picking system, a computing device and a computer-readable storage medium in the field of e-commerce.

BACKGROUND

The rapid development of e-commerce and online shopping has brought an opportunity for the logistics and warehousing industry to rise rapidly and an unprecedented challenge to the logistics and warehousing industry. How to improve sorting efficiency, reduce time from an order for goods to delivering the goods and reduce a labor burden has always been a big issue to be solved in the logistics and warehousing industry. In a past automatic robot picking system, a goods-to-person mode is a relatively common mode. The goods-to-person mode is based on an intelligent carrying robot. The robot automatically drives to a position directly below a target rack, lifts the target rack and sends the target rack to a sorting position according to order demands and inventory information. The sorting position is equipped with a display device such as a display screen. The display device prompts position information of goods required in a delivery order. According to the prompt, a sorting person gets the required goods from the target rack and puts the required goods into a specified container to complete a sorting task. After the sorting task is finished, the robot sends the target rack back to a specified position. The above goods-to-person mode does not require personnel to move around in the whole process, thereby greatly improving the sorting efficiency and reducing labor intensity.

SUMMARY

In a goods-to-person mode based on robots, a sparse rack layout is adopted in which two rows of racks are arranged in parallel and empty rows/columns constitute channels for the robots to pass, thereby ensuring picking efficiency of a robot system. However, users who pay higher rents of warehouses are more likely to desire a further increase of storage efficiency of the warehouses to reduce storage costs. Therefore, how to improve the storage efficiency of this type of system and maintain considerable picking efficiency is a focus of a robot picking system.

The present disclosure is proposed in view of the above circumstances.

According to an aspect of the present disclosure, a goods picking system is provided. The system includes: a plurality of carrying robots, which are capable of lifting and transporting racks; a plurality of racks used for storing goods and being carried by the plurality of carrying robots, where in a rack area, the plurality of racks are arranged in a rack array with a plurality of rows and a plurality of columns, and empty rows/columns constitute channels for the plurality of carrying robots to pass; and at least some of the plurality of racks are blocked racks which are not adjacent to any channel instead of being surrounded by other racks and racks except the blocked racks are referred to as unblocked racks; rack-moving robots, which are operable based on instructions of a control system to move racks in the rack area so as to change a certain blocked rack into an unblocked rack; operating positions, where the plurality of carrying robots carry the plurality of racks to the operating positions and pickers pick goods from the plurality of racks or restock goods onto the plurality of racks; and the control system, which is configured to determine and identify whether goods to be picked involved in an order to be processed relates to the blocked rack, determine a removal strategy in condition that the blocked rack is involved, and instruct one of the rack-moving robots to move racks according to the removal strategy so that the blocked rack becomes the unblocked rack.

Furthermore, in the goods picking system according to an embodiment of the present disclosure, in the rack area, the plurality of racks are divided into a plurality of rack groups, each of the plurality of rack groups is composed of at least two rows of racks and at least two columns of racks, and no channel is configured for the plurality of carrying robots to pass between rows or columns in the each of the plurality of rack groups; the plurality of rack groups are separated by the channels; and the plurality of rack groups are classified into sparse rack groups and dense rack groups, where all racks in each of the sparse rack groups are the unblocked racks and at least one rack in each of the dense rack groups is the blocked rack.

Furthermore, in the goods picking system according to one embodiment of the present disclosure, all rack groups are dense rack groups.

Furthermore, in the goods picking system according to one embodiment of the present disclosure, some rack groups are sparse rack groups and some rack groups are dense rack groups.

Furthermore, in the goods picking system according to one embodiment of the present disclosure, both a number of rows and a number of columns in the each of the dense rack groups are greater than or equal to 3, and at least one of the number of rows and the number of columns in the each of the sparse rack groups is 2.

Furthermore, in the goods picking system according to one embodiment of the present disclosure, a frequency of picking goods from racks in the sparse rack groups is higher than a frequency of picking goods from racks in the dense rack groups.

Furthermore, in the goods picking system according to one embodiment of the present disclosure, a distance of the sparse rack group from the operating position is smaller than a distance of the dense rack group from the operating position.

Furthermore, in the goods picking system according to one embodiment of the present disclosure, in the each of the dense rack groups, a frequency of picking goods from an unblocked rack is higher than a frequency of picking goods from a blocked rack.

Furthermore, in the goods picking system according to one embodiment of the present disclosure, in one of the sparse rack groups, a frequency of picking goods from a rack close to one of the operating positions is higher than a frequency of picking goods from a rack away from the one of the operating positions.

Furthermore, in the goods picking system according to one embodiment of the present disclosure, the control system operates to determine that a rack to be carried by one of the plurality of carrying robots is a blocked rack; determine a moving strategy for changing the blocked rack into an unblocked rack, where the moving strategy involves a minimum number of racks to be moved; and instruct one of the rack-moving robots to move racks according to the moving strategy.

Furthermore, in the goods picking system according to one embodiment of the present disclosure, the rack-moving robots are the same robots as the plurality of carrying robots.

Furthermore, in the goods picking system according to one embodiment of the present disclosure, one of the rack-moving robots cooperates with one of the plurality of carrying robots in the following manner:

The one of the rack-moving robots moves a rack which blocks a blocked rack to a temporary storage area which does not hinder carrying of the one of the plurality of carrying robots.

The one of the plurality of carrying robots carries the blocked rack towards a target operating position along a predetermined planned route.

The one of the rack-moving robots moves the rack stored in the temporary storage area back to its original position.

Furthermore, in the goods picking system according to one embodiment of the present disclosure, the temporary storage area is an empty position left by a rack which has been carried away.

Furthermore, in the goods picking system according to one embodiment of the present disclosure, the temporary storage area is in an opposite direction of a traveling direction of the one of the plurality of carrying robots.

Furthermore, in the goods picking system according to one embodiment of the present disclosure, before one of the plurality of carrying robots reaches a place which has a predetermined distance from an original position of a blocked rack or before predetermined time, one of the rack-moving robots performs the following steps: moving out a rack which blocks the blocked rack; moving out the blocked rack; moving the rack which blocks the blocked rack back to a rack group where the blocked rack is located; moving the blocked rack back to the rack group so that the blocked rack becomes an unblocked rack.

Furthermore, in the goods picking system according to one embodiment of the present disclosure, before one of the plurality of carrying robots reaches a place which has a predetermined distance from an original position of a blocked rack or before predetermined time, one of the rack-moving robots moves out racks which block the blocked rack to a temporary storage area which does not hinder traveling of the one of the plurality of carrying robots; the one of the rack-moving robots moves out the blocked rack and places the blocked rack on a traveling route of the one of the plurality of carrying robots; the one of the plurality of carrying robots encounters the blocked rack on the traveling route, carries the blocked rack and travels towards a target operating position along a predetermined planned route; and the one of the rack-moving robots moves the racks which block the blocked rack back to its original position or the one of the rack-moving robots moves one of the racks which blocks the blocked rack to a position occupied by the blocked rack.

Furthermore, in the goods picking system according to one embodiment of the present disclosure, before one of the plurality of carrying robots reaches a place which has a predetermined distance from an original position of a blocked rack or before predetermined time, one of the rack-moving robots moves the blocked rack to a position which makes the blocked rack at an unblocked state in a rack group where the blocked rack is located or another rack group.

Furthermore, in the goods picking system according to one embodiment of the present disclosure, one carrying robot which undertakes a task of carrying a blocked rack also serves as a rack-moving robot which moves related racks to change the blocked rack into an unblocked rack.

Furthermore, in the goods picking system according to one embodiment of the present disclosure, one carrying robot in an idle state temporarily serves as a racking-moving robot to change a certain blocked rack into an unblocked rack.

Furthermore, in the goods picking system according to one embodiment of the present disclosure, the control system determines racks to be carried in a future period and instructs the rack-moving robots to change the racks to be carried into unblocked racks.

Furthermore, in the goods picking system according to one embodiment of the present disclosure, at least some of the racks to be carried are changed from a blocked state to an unblocked state in parallel.

According to another aspect of the present disclosure, provided is a goods picking method executed by a goods picking system. The goods picking system includes: a plurality of carrying robots capable of lifting and transporting racks; a plurality of racks used for storing goods and being carried by the plurality of carrying robots; where in a rack area, the plurality of racks are arranged in a rack array with a plurality of rows and a plurality of columns, and empty rows/columns constitute channels for the plurality of carrying robots to pass; and at least some of the plurality of racks are blocked racks which are not adjacent to any channel instead of being surrounded by other racks and racks except the blocked racks are referred to as unblocked racks; rack-moving robots, which move racks in the rack area based on instructions of a control system so as to change a certain blocked rack into an unblocked rack; operating positions to which the plurality of carrying robots carry the plurality of racks and at which pickers pick goods from the plurality of racks or restock goods onto the plurality of racks; and the control system. The goods picking method includes the flowing steps: the control system determines a rack to be carried according to an order to be processed; the control system determines whether the rack to be carried is a blocked rack; if the rack to be carried is determined to be the blocked rack, the control system determines a removal strategy and instructs one rack-moving robot to move racks according to the removal strategy so that the blocked rack becomes an unblocked rack; one carrying robot moves to a position of the changed unblocked rack along a planned route and carries the unblocked rack to one operating position for a picker to pick goods; and the one carrying robot carries the unblocked rack from which goods picking is completed back to the rack area.

Furthermore, in the goods picking method according to an embodiment of the present disclosure, in the rack area, the plurality of racks are divided into a plurality of rack groups, and the plurality of rack groups are classified into sparse rack groups and dense rack groups, where all racks in each of the sparse rack groups are the unblocked racks and at least one rack in each of the dense rack groups is the blocked rack.

Furthermore, in the goods picking method according to an embodiment of the present disclosure, all rack groups are dense rack groups.

Furthermore, in the goods picking method according to an embodiment of the present disclosure, some rack groups are sparse rack groups and some rack groups are dense rack groups.

Furthermore, in the goods picking method according to an embodiment of the present disclosure, each of the plurality of rack groups is composed of at least two rows of racks and at least two columns of racks, there is no channel for the plurality of carrying robots to pass between rows or columns in the each of the plurality of rack groups, and the plurality of rack groups are separated by the channels; both a number of rows and a number of columns in the each of the dense rack groups are greater than or equal to 3; and at least one of the number of rows and the number of columns in the each of the sparse rack groups is 2.

Furthermore, in the goods picking method according to an embodiment of the present disclosure, a frequency of picking goods from racks in the sparse rack groups is higher than a frequency of picking goods from racks in the dense rack groups.

Furthermore, in the goods picking method according to an embodiment of the present disclosure, a distance of the sparse rack groups from the operating positions is smaller than a distance of the dense rack groups from the operating positions.

Furthermore, in the goods picking method according to an embodiment of the present disclosure, in the each of the dense rack groups, a frequency of picking goods from an unblocked rack is higher than a frequency of picking goods from a blocked rack.

Furthermore, in the goods picking method according to an embodiment of the present disclosure, in one of the sparse rack groups, a frequency of picking goods from a rack close to one of the operating positions is higher than a frequency of picking goods from a rack far from the one of the operating positions.

Furthermore, in the goods picking method according to an embodiment of the present disclosure, the control system operates to determine that the rack to be carried by the one carrying robot is the blocked rack; determine a moving strategy for changing the blocked rack into the unblocked rack, where the moving strategy involves a minimum number of racks to be moved; and instruct the one rack-moving robot to move the racks according to the moving strategy.

Furthermore, in the goods picking method according to an embodiment of the present disclosure, the rack-moving robots are the same robots as the plurality of carrying robots.

Furthermore, in the goods picking method according to an embodiment of the present disclosure, the one rack-moving robot cooperates with the one carrying robot in the following manner: the one rack-moving robot moves a rack which blocks the blocked rack to a temporary storage area which does not hinder carrying of the one carrying robot; the one carrying robot carries the blocked rack towards a target operating position along a predetermined planned route; and the one rack-moving robot moves the rack stored in the temporary storage area back to its original position.

Furthermore, in the goods picking method according to an embodiment of the present disclosure, the temporary storage area is an empty position left by a rack which has been carried away.

Furthermore, in the goods picking method according to an embodiment of the present disclosure, the temporary storage area is in an opposite direction of a traveling direction of the one carrying robot.

Furthermore, in the goods picking method according to an embodiment of the present disclosure, before the one carrying robot reaches a place which has a predetermined distance from an original position of the blocked rack or before predetermined time, the one rack-moving robot performs the following steps: moving out a rack which blocks the blocked rack; moving out the blocked rack; moving the rack which blocks the blocked rack back to a rack group where the blocked rack is located; and moving the blocked rack back to the rack group so that the blocked rack becomes the unblocked rack.

Furthermore, in the goods picking method according to an embodiment of the present disclosure, before the one carrying robot reaches a place which has a predetermined distance from an original position of the blocked rack or before predetermined time, the one rack-moving robot cooperates with the one carrying robot through the following manner: the one rack-moving robot moves out racks which block the blocked rack to a temporary storage area which does not hinder traveling of the one carrying robot; the one rack-moving robot moves out the blocked rack and places the blocked rack on a traveling route of the one carrying robot; the one carrying robot encounters the blocked rack on the traveling route, carries the blocked rack and travels towards a target operating position along a predetermined planned route; and the one rack-moving robot moves the racks which block the blocked rack back to its original position or the one rack-moving robot moves one of the racks which blocks the blocked rack to a position occupied by the blocked rack.

Furthermore, in the goods picking method according to an embodiment of the present disclosure, before the one carrying robot reaches a place which has a predetermined distance from an original position of the blocked rack or before predetermined time, the one rack-moving robot moves the blocked rack to a position which makes the blocked rack at an unblocked state in a rack group where the blocked rack is located or another rack group.

Furthermore, in the goods picking method according to an embodiment of the present disclosure, one carrying robot which undertakes a task of carrying a blocked rack also serves as a rack-moving robot which moves related racks to change the blocked rack into an unblocked rack.

Furthermore, in the goods picking method according to an embodiment of the present disclosure, one carrying robot in an idle state temporarily serves as a racking-moving robot to change a certain blocked rack into an unblocked rack.

Furthermore, in the goods picking method according to an embodiment of the present disclosure, the control system determines racks to be carried in a future period and instructs the rack-moving robots to change the racks to be carried into unblocked racks.

Furthermore, in the goods picking method according to an embodiment of the present disclosure, at least some of the racks to be carried are changed from a blocked state to an unblocked state in parallel.

A goods storage and picking technology according to the embodiments of the present disclosure can improve a goods storage density, make full use of physical spaces and maintain picking efficiency satisfying requirements.

BRIEF DESCRIPTION OF DRAWINGS

These and/or other aspects and advantages of the present disclosure will become more apparent and easily understood from the following detailed description of embodiments of the present disclosure in connection with the drawings. In the drawing.

DETAILED DESCRIPTION

For a further understanding of the present disclosure by those skilled in the art, the present disclosure will be described in further detail below in conjunction with the drawings and specific embodiments.

Figure 1:
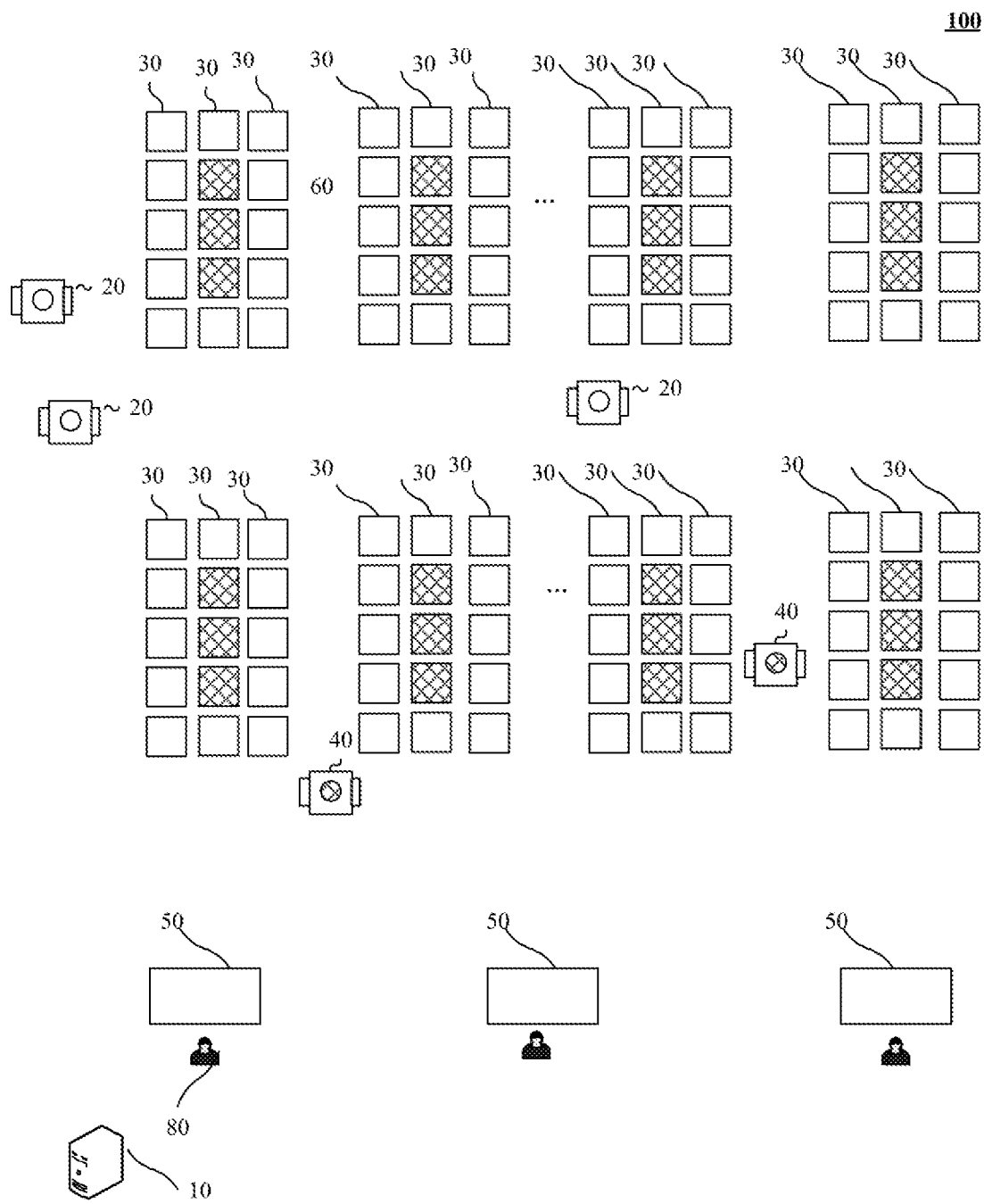
FIG. 1 illustrates a compositional diagram of a goods picking system 100 according to an embodiment of the present disclosure.

FIG. 1 illustrates a goods picking system 100 according to an embodiment of the present disclosure. The goods picking system 100 includes a control system 10, carrying robots 20, racks 30, rack-moving robots 40 and operating positions 50.

A plurality of carrying robots 20 can lift and transport the racks 30. The carrying robots 20 perform a goods carrying task under the control of the control system 10. For example, a carrying robot 20 may drive in an empty space 60 (part of channels for the carrying robots to pass) between rack arrays to below a target rack 30, lift the target rack 30 and carry the target rack 30 to an assigned operating position 50. In one example, each carrying robot has a lifting mechanism and an autonomous navigation function. The carrying robots can drive to below the target rack and lift the whole rack with the lifting mechanism so that the rack can move up and down with a tray which has a lifting function. In one example, the carrying robots can drive forward according to two-dimensional code information captured by a camera and can drive along a route determined by the control system 10 to below a rack prompted by the control system.

A plurality of racks 30 are used for storing goods and being carried by the carrying robots. In a rack area, the racks are arranged in a rack array with a plurality of rows and a plurality of columns, and empty rows/columns 60 constitute channels for the carrying robots 20 to pass. Among the racks, at least some are blocked racks (gray racks shown in FIG. 1) which are not adjacent to any channel instead of being surrounded by other racks. The racks except the blocked racks are referred to as unblocked racks (white racks shown in FIG. 1).

In one example, each rack 30 is a cuboid frame with a plurality of layers for placing goods. The racks are carried by the carrying robots 20 and a picker picks goods from the racks. A bottom of each rack has four symmetrical rack legs whose heights are larger than a height of each robot. The robots are allowed to pass through the bottom of the racks. Each layer of the racks also has a corresponding tag for identification. In one example, the bottom of each rack has a two-dimensional code for the carrying robots to identify, and the two-dimensional code of each rack has uniqueness. As many types of goods are placed on each rack as possible to enable each rack to cover as many orders as possible and reduce times of carrying the racks.

Figure 2:
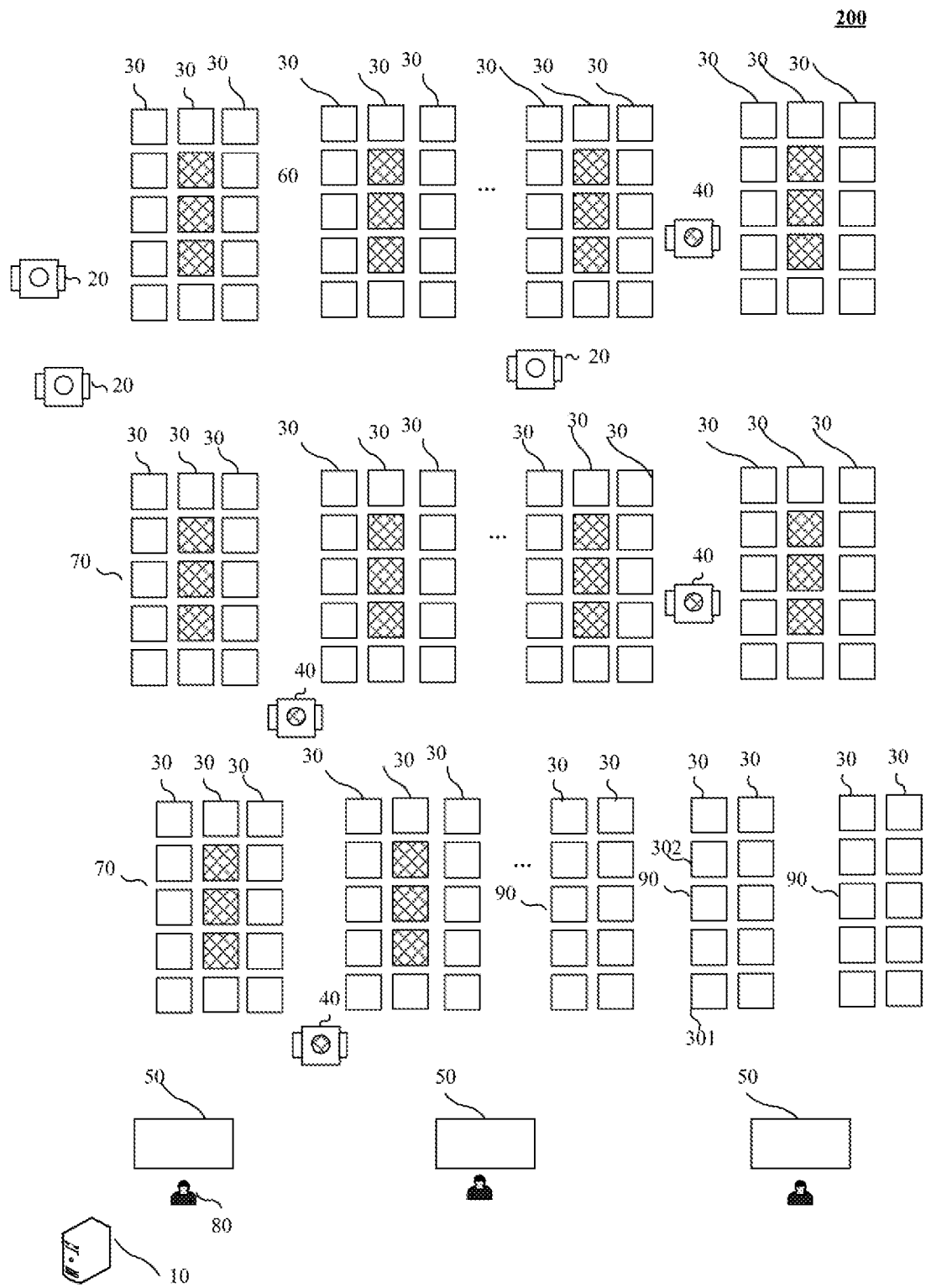
FIG. 2 illustrates a compositional diagram of a goods picking system 200 in which a rack area simultaneously has a dense rack group and a sparse rack group according to an embodiment of the present disclosure.

The racks in the rack area may be regarded as being divided into a plurality of rack groups by the channels. Each rack group is composed of at least two rows of racks and at least two columns of racks, and there is no channel for the carrying robots to pass between rows or columns in the rack group. The rack groups are separated by channels. A rack group with a blocked rack is referred to as a dense rack group (a rack group 70 as shown in FIG. 2), and a rack group without the blocked rack is referred to as a sparse rack group (a rack group 90 as shown in FIG. 2).

In the dense rack group, both a number of rows and a number of columns are greater than or equal to 3. In the sparse rack group, at least one of the number of rows and the number of columns is 2.

In one example, the rack groups in the rack area are all dense rack groups, as shown in FIG. 1.

In another example, the rack area also has the rack group without the blocked rack, which is referred to herein as the sparse rack group 90. That is, the rack groups are a combination of the sparse rack group 90 and the dense rack group 70, as shown in FIG. 2. The combination of the sparse rack group and the dense rack group provides great flexibility to the goods picking system, which can not only improve a goods storage density and make full use of the space but also can conduct sparse storage for certain goods and achieve higher transport efficiency.

In one example, a frequency of picking goods from racks in the sparse rack group 90 is higher than a frequency of picking goods from racks in the dense rack group 70. That is, popular goods are placed on the racks of the sparse rack group so that when the picking related to the popular goods is performed, one carrying robot can directly drive to below the rack to be carried and carry the rack to the operating position along a specified route without rack moving by the rack-moving robot, thereby improving rack carrying and picking efficiency.

In one example, a distance of the sparse rack group 90 from the operating positions 50 is smaller than a distance of the dense rack group 70 from the operating positions 50. In this way, the racks of the sparse rack group can be further carried to the operating position as soon as possible, thereby improving the rack carrying and picking efficiency.

In one example, in the dense group 70, a frequency of picking goods from the unblocked rack is higher than a frequency of picking goods from the blocked rack. In this way, the rack carrying and picking efficiency can be improved as a whole.

In one example, in the sparse rack group, a frequency of picking goods from a rack close to the operating position (such as a rack 301) is higher than a frequency of picking goods from a rack far from the operating position (such as a rack 302).

In the rack area, the rack-moving robots 40 are operable based on instructions of the control system to move the racks so as to change a certain blocked rack into the unblocked rack.

The operating positions 50 are places for pickers to perform picking operations. The carrying robots 20 carry the racks 30 to the operating positions 50 for pickers 80 (picking persons or robots) to pick goods from the racks 30 or restock goods onto the racks 30.

In another example, a restocking operation may also be performed in an area different from the operating positions 50, for example, in a dedicated restocking area. The carrying robots 20 carry the racks 30 to the dedicated restocking area for restocking.

In one example, the ground between racks has two-dimensional codes of fixed coordinates. The robots capture the two-dimensional codes on the ground with cameras and identify the two-dimensional codes so that the robots can know their positions and perform autonomous navigation.

The two-dimensional codes are merely examples of identifiers for the racks or locations. Other identifiable tags such as radio frequency identification (RFID), may be employed.

The control system 10 is configured to determine and identify whether the goods to be picked involved in an order to be processed relates to the blocked rack, determine a removal strategy if the blocked rack is involved, and instruct one rack-moving robot 40 to move the racks according to the removal strategy so that the blocked rack becomes the unblocked rack.

The control system 10 may be a computing platform composed of components such as a processor, a memory, software and a network. The control system 10 may provide an electronic shopping service to an e-commerce individual user. The control system 10 may include one or more servers, and may be a centralized control architecture or a distributed computing architecture. The server may have a processor and a memory which may include an order pool therein.

The control system also stores logo information of the robots and the system, order information and information about operation processes.

The control system 10 is operable to communicate with the carrying robots 20, auxiliary display devices at the operating positions and the pickers in a communication manner such as a wireless communication technology or a wired communication technology. The control system 10 is also operable to communicate with the outside via a network.

A user may use a client terminal to be connected to the control system 10 via the network and the user makes an order through a shopping user interface of an electronic shopping application (APP). Based on the order, the control system 10 determines the rack to be carried, the carrying robot responsible for the carrying, the operating position to which the rack is carried and a carrying route of the carrying robot, delivers a carrying instruction to the carrying robot, and instructs the picker at the operating position to perform the picking operation.

A goods picking method according to an embodiment of the present disclosure will be described below with reference to FIG. 3.

Figure 3:
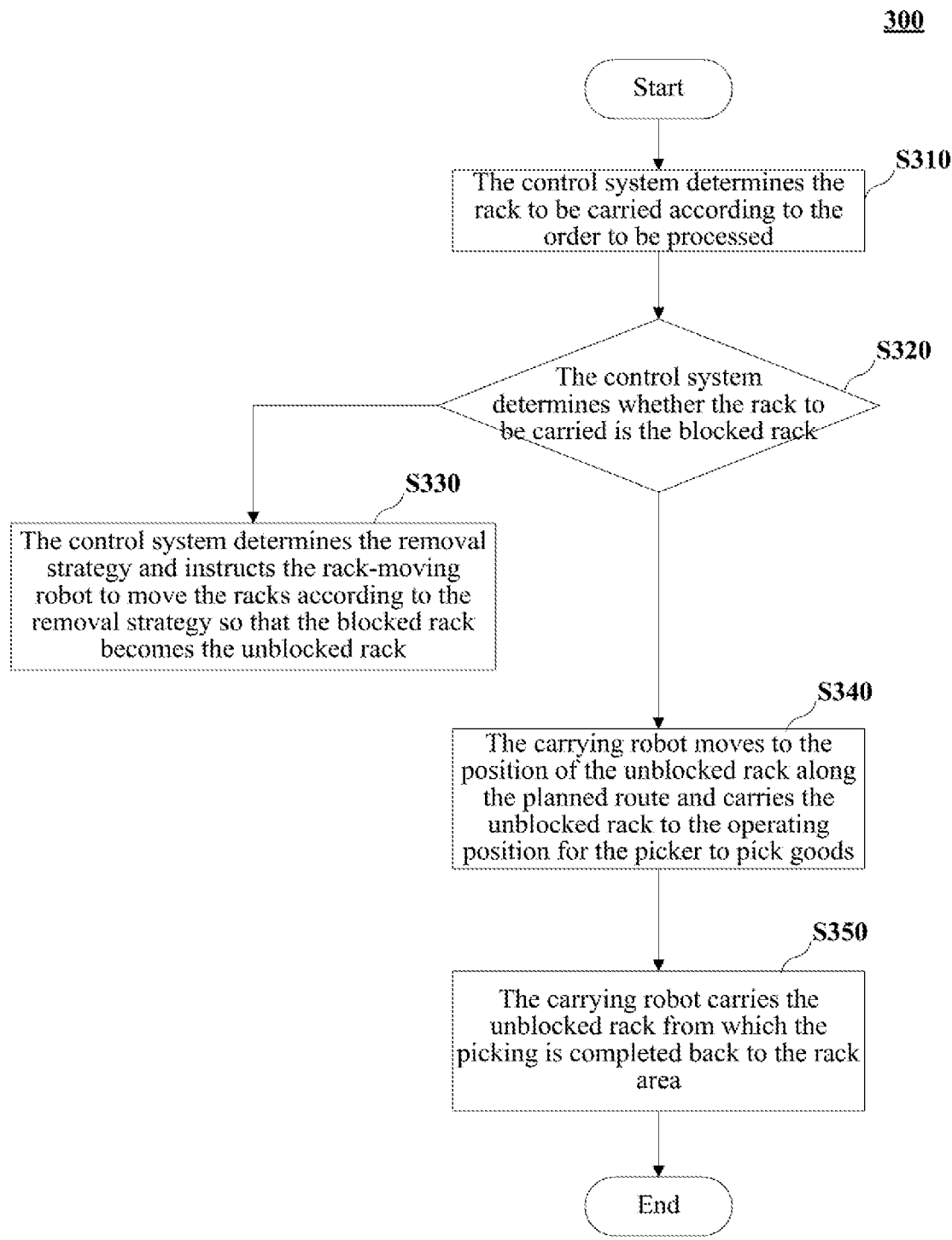
FIG. 3 illustrates an overall flowchart of a goods picking method 300 according to an embodiment of the present disclosure.

FIG. 3 illustrates an overall flowchart of a goods picking method 300 according to an embodiment of the present disclosure.

As shown in FIG. 3, in step S310, the control system determines the rack to be carried according to the order to be processed.

In step S320, the control system determines whether the rack to be carried is a blocked rack. In condition that the rack to be carried is the blocked rack, proceed to step S330, and otherwise proceed to step S340.

In step S330, for the blocked rack, the control system determines the removal strategy and instructs the rack-moving robot to move the racks according to the removal strategy so that the blocked rack becomes the unblocked rack.

In one example, the step in which the control system determines the removal strategy includes determining a moving strategy for changing the blocked rack into the unblocked rack, where the moving strategy involves a minimum number of racks to be moved.

The following describes a method for carrying the rack by the rack-moving robot and the carrying robot together as individual robots.

In one example, the rack-moving robot and the carrying robot work together as individual robots to complete the rack carrying in accordance with the following steps:

(1) Before the carrying robot arrives, according to the moving strategy determined by the control system, the rack-moving robot carries a rack h which blocks a blocked rack o to a temporary storage area that does not hinder the carrying of the carrying robot. At this time, the blocked rack is no longer a blocked rack, that is, it has become an unblocked rack.

Figure 4:
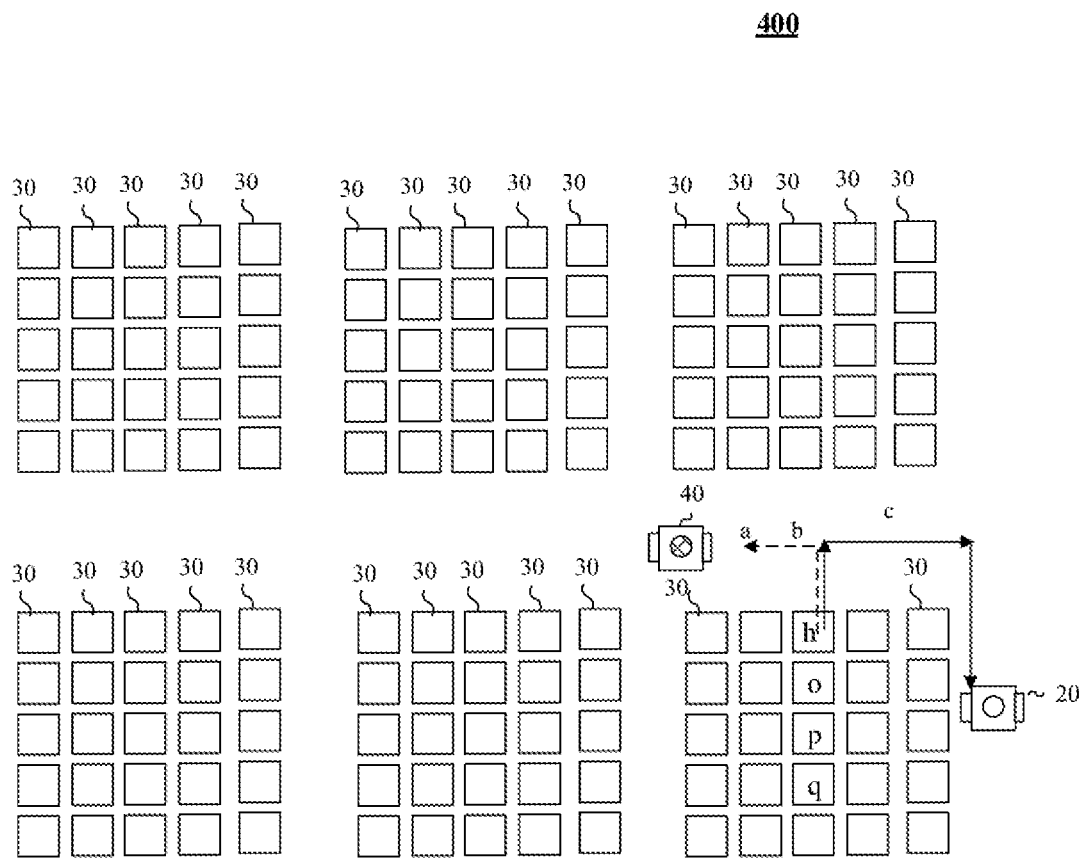
FIG. 4 schematically illustrates an example in which a rack-moving robot moves a rack and a carrying robot carries a rack.

FIG. 4 schematically illustrates an example in which a rack-moving robot moves a rack and a carrying robot carries a rack. As shown in FIG. 4, the system requires that a rack at a position o be carried to the operating position. The operation flow is as follows: I. the rack-moving robot 40 undertakes to carry a rack at a position h at a beginning end of a dashed line to a position a at an arrow end of the dashed line; II. the carrying robot 20 carries the rack at the position o along a planned route to a picking position; III. after the carrying robot 20 leaves a position b, a rack-moving robot 40 is assisted in carrying the rack back to the position o or the position h (the specific position is determined by an algorithm and a service scenario), thereby ensuring an unblocked channel.

Here, when the rack to be carried is at the position o, in terms of directions on a paper surface, moving the rack at the position h above the position o is a scheme of carrying a minimum number of racks compared with moving racks left, right and below. However, if the rack to be carried is at a position p, a same number of racks, two racks, are to be moved in left, right, upward and downward directions. If the rack to be carried is at a position q, moving a rack below is a scheme of carrying a minimum number of racks compared with moving racks above, left and right.

Here the position a is taken as the temporary storage area.

(2) The carrying robot arrives at the position of the rack to be carried, directly lifts the rack, and carries it to a target operating position along a predetermined planned route.

In FIG. 4, a carrying direction is a direction along a route indicated by a letter c. It can be seen that the temporary storage area a is in an opposite direction of the carrying route.

In another example, the temporary storage area may be an empty position left by the rack which has been carried away. Alternatively, the temporary storage area may be an area specially configured for temporarily storing a rack.

(3) The rack-moving robot moves the rack stored in the temporary storage area back to its original position.

In another example, the rack-moving robot places the rack stored in the temporary storage area at another empty position instead of moving it back to its original position, and updates information about the position for placing the rack stored in the control system.

In the foregoing examples, the rack-moving robot interacts and cooperates with the carrying robot: after the carrying robot carries away the rack to be carried, the rack-moving robot moves the rack stored in the temporary storage area back to its original position.

In another example, before the carrying robot arrives, the rack-moving robot moves out the rack to be carried in advance to prevent it from being blocked by any rack so that it can be directly carried away by the carrying robot. For example, the position of the rack to be carried may be changed with a position of another blocked rack.

Specifically, in one example, before the carrying robot reaches a place which has a predetermined distance from the original position of the blocked rack, or before predetermined time, the rack-moving robot operates to move out a rack which blocks the blocked rack, move out the blocked rack, move the rack which blocks the blocked rack back to the rack group and move the blocked rack to the rack group, so that the blocked rack becomes the unblocked rack.

In another example, the rack to be carried may be located on a carrying route of the carrying robot which will carry the rack, and the control system is notified of a specific position of the rack to be carried; the control system notifies the carrying robot of the specific position and the carrying robot directly moves to the specific position and carries the rack away. For example, before the carrying robot reaches the place which has the predetermined distance from the original position of the blocked rack, or before the predetermined time, the rack-moving robot cooperates with the carrying robot in the following manner: the rack-moving robot moves out the rack which blocks the blocked rack and places the rack in the temporary storage area which does not hinder the traveling of the carrying robot; the rack-moving robot moves out the blocked rack and places the blocked rack on a traveling route of the carrying robot; the carrying robot encounters the blocked rack on its traveling route, lifts the blocked rack, and travels towards the target operating position along the predetermined planned route; the rack-moving robot moves the rack which blocks the blocked rack back to the original position or moves it to the position of the original blocked rack.

In one example, before the carrying robot reaches the place which has the predetermined distance from the original position of the blocked rack, or before the predetermined time, the rack-moving robot moves the blocked rack to a position which makes the rack at an unblocked state in this rack group or another rack group.

In one example, before the carrying robot reaches the place which has the predetermined distance from the original position of the blocked rack, or before the predetermined time, the rack-moving robot moves one or more racks which block the blocked rack to empty positions in this rack group or another rack group.

In step S340, the carrying robot moves to the position of the rack to be carried at the unblocked state and carries the unblocked rack to the operating position for the picker to pick goods.

In step S350, the carrying robot carries the unblocked rack from which the picking is completed back to the rack area.

In the foregoing examples, one rack to be carried is changed from a blocked state to an unblocked state. In another example, the racks to be carried in a future period may be determined and changed from the blocked state to the unblocked state. In one example, the racks to be carried may be changed from the blocked state to the unblocked state in parallel.

In the foregoing examples, the rack-moving robot and the carrying robot are robots with different roles. The rack-moving robot is responsible for moving the racks to change the blocked rack to be carried into the unblocked rack; while the carrying robot is responsible for carrying the racks. This is an example and not a limitation. In another example, one robot may serve as both the rack-moving robot and the carrying robot. In one example, the carrying robot assigned to carry a certain blocked rack is also responsible for moving the blocked rack. That is, the carrying robot moves related racks to change the blocked rack into the unblocked rack and then carries the rack to the operating position. In another example, one carrying robot in an idle state temporarily serves as the racking-moving robot to change a certain blocked rack into an unblocked rack.

The above have described various embodiment of the present disclosure. The above description is illustrative, and not exhaustive, and not limited to the disclosed various embodiments. Without departing from the scope and spirit of the described various embodiments, various modifications and variations are apparent to those skilled in the art. Therefore, the protection scope of the present disclosure is subject to the protection scope of the claims.

What is claimed is:

1. A goods picking system, comprising:
   a control system;
   a plurality of carrying robots, which are capable of lifting and transporting racks;
   a plurality of racks used for storing goods and being carried by the plurality of carrying robots, wherein in a rack area, the plurality of racks are arranged in a rack array with a plurality of rows and a plurality of columns, and empty rows and columns constitute channels for the plurality of carrying robots to pass, and at least some of the plurality of racks are blocked racks which are not adjacent to any channel instead of being surrounded by other racks and racks except the blocked racks are referred to as unblocked racks;
   rack-moving robots, which are operable based on instructions of the control system to move racks in the rack area so as to change a certain blocked rack into an unblocked rack;
   operating positions, wherein the plurality of carrying robots carry the plurality of racks to the operating positions, and pickers pick goods from the plurality of racks or restock goods onto the plurality of racks; and
   wherein the control system is configured to: determine and identify whether goods to be picked involved in an order to be processed relates to a blocked rack; determine a removal strategy in a condition where a blocked rack is involved, and instruct one of the rack-moving robots to move the blocked rack according to the removal strategy so that the blocked rack becomes an unblocked rack,
   in the rack area, the plurality of racks are divided into a plurality of rack groups, each of the plurality of rack groups is composed of at least two rows of racks and at least two columns of racks, and no channel is configured for the plurality of carrying robots to pass between rows or columns in the each of the plurality of rack groups; wherein the plurality of rack groups are separated by the channels; and wherein the plurality of rack groups comprise sparse rack groups and dense rack groups, wherein all racks in each of the sparse rack groups are unblocked racks and at least one rack in each of the dense rack groups is a blocked rack, and in the each of the dense rack groups, a frequency of picking goods from an unblocked rack is higher than a frequency of picking goods from a blocked rack.

2. The goods picking system of claim 1, wherein both a number of rows and a number of columns in the each of the dense rack groups are greater than or equal to 3; and
   at least one of the number of rows and the number of columns in the each of the sparse rack groups is 2.

3. The goods picking system of claim 1, wherein a distance of one of the sparse rack groups from one of the operating positions is smaller than a distance of one of the dense rack groups from the one of the operating positions.

4. The goods picking system of claim 1, wherein in one of the sparse rack groups, a frequency of picking goods from a rack closer to one of the operating positions than other racks in the one of the sparse rack groups is higher than a frequency of picking goods from a rack away from the one of the operating positions.

5. The goods picking system of claim 1, wherein the control system is configured to: operate in response to determining that a rack to be carried by one of the plurality of carrying robots is a blocked rack;
   determine a moving strategy for changing the blocked rack into an unblocked rack, wherein the moving strategy involves a minimum number of racks to be moved; and
   instruct one of the rack-moving robots to move racks according to the moving strategy.

6. The goods picking system of claim 1, wherein the rack-moving robots are the same robots as the plurality of carrying robots.

7. The goods picking system of claim 1, wherein one of the rack-moving robots cooperates with one of the plurality of carrying robots by moving a rack which blocks the blocked rack to a temporary storage area which does not hinder carrying of the one of the plurality of carrying robots, wherein one of the wherein the temporary storage area is an empty position left by a rack which has been carried away.

8. The goods picking system of claim 1, wherein one of the rack-moving robots cooperates with one of the plurality of carrying robots by moving a rack which blocks the blocked rack to a temporary storage area which does not hinder carrying of the one of the plurality of carrying robots, wherein the temporary storage area is in an opposite direction of a traveling direction of the one of the plurality of carrying robots.

9. The goods picking system of claim 1, wherein before one of the plurality of carrying robots reaches a place having a predetermined distance from an original position of a blocked rack or before a predetermined time, one of the rack-moving robots performs the following steps:
   moving out a rack which blocks the blocked rack;
   moving out the blocked rack;
   moving the rack which blocks the blocked rack back to a rack group where the blocked rack is located; and
   moving the blocked rack back to the rack group so that the blocked rack becomes an unblocked rack.

10. The goods picking system of claim 1, wherein before one of the plurality of carrying robots reaches a place having a predetermined distance from an original position of a blocked rack or before a predetermined time,
   one of the rack-moving robots moves out racks which block the blocked rack to a temporary storage area which does not hinder traveling of the one of the plurality of carrying robots;
   the one of the rack-moving robots moves out the blocked rack and places the blocked rack on a traveling route of the one of the plurality of carrying robots;
   the one of the plurality of carrying robots encounters the blocked rack on the traveling route, carries the blocked rack and travels towards a target operating position along a predetermined planned route; and
   the one of the rack-moving robots moves the racks which block the blocked rack back to its original position or the one of the rack-moving robots moves of the racks which block the blocked rack back to a position occupied by the blocked rack.

11. The goods picking system of claim 1, wherein before one of the plurality of carrying robots reaches a place having a predetermined distance from an original position of a blocked rack or before a predetermined time, one of the rack-moving robots moves the blocked rack to a position which makes the blocked rack at an unblocked state in a rack group where the blocked rack is located or another rack group.

12. The goods picking system of claim 1, wherein one the plurality of carrying robots which undertakes a task of carrying a blocked rack also serves as a rack-moving robot which moves related racks to change the blocked rack into an unblocked rack.

13. The goods picking system of claim 1, wherein one the plurality of carrying robots in an idle state temporarily serves as a racking-moving robot to change the certain blocked rack into the unblocked rack.

14. The goods picking system of claim 1, wherein the control system is configured to: determine racks to be carried in a future period and instruct the rack-moving robots to change the racks to be carried into unblocked racks.

15. The goods picking system of claim 14, wherein at least some of the racks to be carried are changed from a blocked state to an unblocked state in parallel.

16. The goods picking system of claim 1, wherein a frequency of picking goods from racks in the sparse rack groups is higher than a frequency of picking goods from racks in the dense rack groups.

17. A goods picking method executed by a goods picking system, wherein the goods picking system comprises:
   a control system;
   a plurality of carrying robots, which are capable of lifting and transporting racks;
   a plurality of racks used for storing goods and being carried by the plurality of carrying robots; wherein in a rack area, the plurality of racks are arranged in a rack array with a plurality of rows and a plurality of columns, and empty rows and columns constitute channels for the plurality of carrying robots to pass, and at least some of the plurality of racks are blocked racks which are not adjacent to any channel instead of being surrounded by other racks and racks except the blocked racks are referred to as unblocked racks;
   rack-moving robots, which move racks in the rack area based on instructions of the control system so as to change a certain blocked rack into an unblocked rack; and
   operating positions, wherein the plurality of carrying robots carry the plurality of racks to the operating positions, and pickers pick goods from the plurality of racks or restock goods onto the plurality of racks;
   wherein in the rack area, the plurality of racks are divided into a plurality of rack groups, each of the plurality of rack groups is composed of at least two rows of racks and at least two columns of racks, and no channel is configured for the plurality of carrying robots to pass between rows or columns in the each of the plurality of rack groups; wherein the plurality of rack groups are separated by the channels; and wherein the plurality of rack groups comprises sparse rack groups and dense rack groups, wherein all racks in each of the sparse rack groups are unblocked racks and at least one rack in each of the dense rack groups is a blocked rack, and in the each of the dense rack groups, a frequency of picking goods from an unblocked rack is higher than a frequency of picking goods from a blocked rack,
   and wherein the goods picking method comprises:
   determining, by the control system, a rack to be carried according to an order to be processed;
   determining, by the control system, whether the rack to be carried is a blocked rack;

in a condition where a rack to be carried is determined to be a blocked rack, determining, by the control system, a removal strategy and instructing one of the rack-moving robots to move racks according to the removal strategy so that the blocked rack becomes an unblocked rack;

one of the plurality of carrying robots moves to a position of the changed unblocked rack along a planned route and carries the unblocked rack to one operating position for a picker to pick goods; and the one of the plurality of carrying robots carries the unblocked rack from which goods picking is completed back to the rack area.

\* \* \* \* \*